United States Patent [19]

West et al.

[11] 3,972,363
[45] Aug. 3, 1976

[54] MACHINE FOR CHANGING GIANT TIRES

[76] Inventors: Vallie D. West, 724 N. Washington St.; Jesse Kennedy, 201 S. Illinois Ave., both of DuQuoin, Ill. 62832

[22] Filed: Jan. 16, 1975

[21] Appl. No.: 541,442

[52] U.S. Cl. ............................................. 157/1.26
[51] Int. Cl.² ........................................ B60C 25/06
[58] Field of Search ................... 157/1.2, 1.26, 1.28, 157/1.33

[56] References Cited
UNITED STATES PATENTS

| | | | |
|---|---|---|---|
| 2,469,723 | 5/1949 | Greene | 157/1.2 |
| 2,521,149 | 9/1950 | Butler et al. | 157/1.2 |
| 2,537,041 | 1/1951 | Finch | 157/1.2 |
| 2,551,994 | 5/1951 | Bloodworth et al. | 157/1.2 |
| 3,221,795 | 12/1965 | Whited | 157/1.2 |
| 3,266,548 | 8/1966 | Kolosowsky | 157/1.33 |
| 3,276,504 | 10/1966 | Duquesne | 157/1.2 |

*Primary Examiner*—Al Lawrence Smith
*Assistant Examiner*—James G. Smith
*Attorney, Agent, or Firm*—Gravely, Lieder & Woodruff

[57] ABSTRACT

A machine for breaking the beads on the sidewalls of a giant tire away from the tapered bead seats on a multipiece rim, includes upright backing members against which the giant tire and its rim are positioned and a press-head which is forced against that sidewall of giant tire which is positioned away from the backing members. The force exerted on the press head is derived from a hydraulic cylinder and is transferred to the press head through the center of the rim. The cylinder is detachable from the press head so that a tire can be positioned between the backing members and the press head. The press head rotates and has shoes which bear against the tire sidewall and are movable in the radial direction to accommodate tires of different size. Restraining means are provided for preventing the bead seat ring of the rim from moving toward the backing members under the applied force.

18 Claims, 8 Drawing Figures

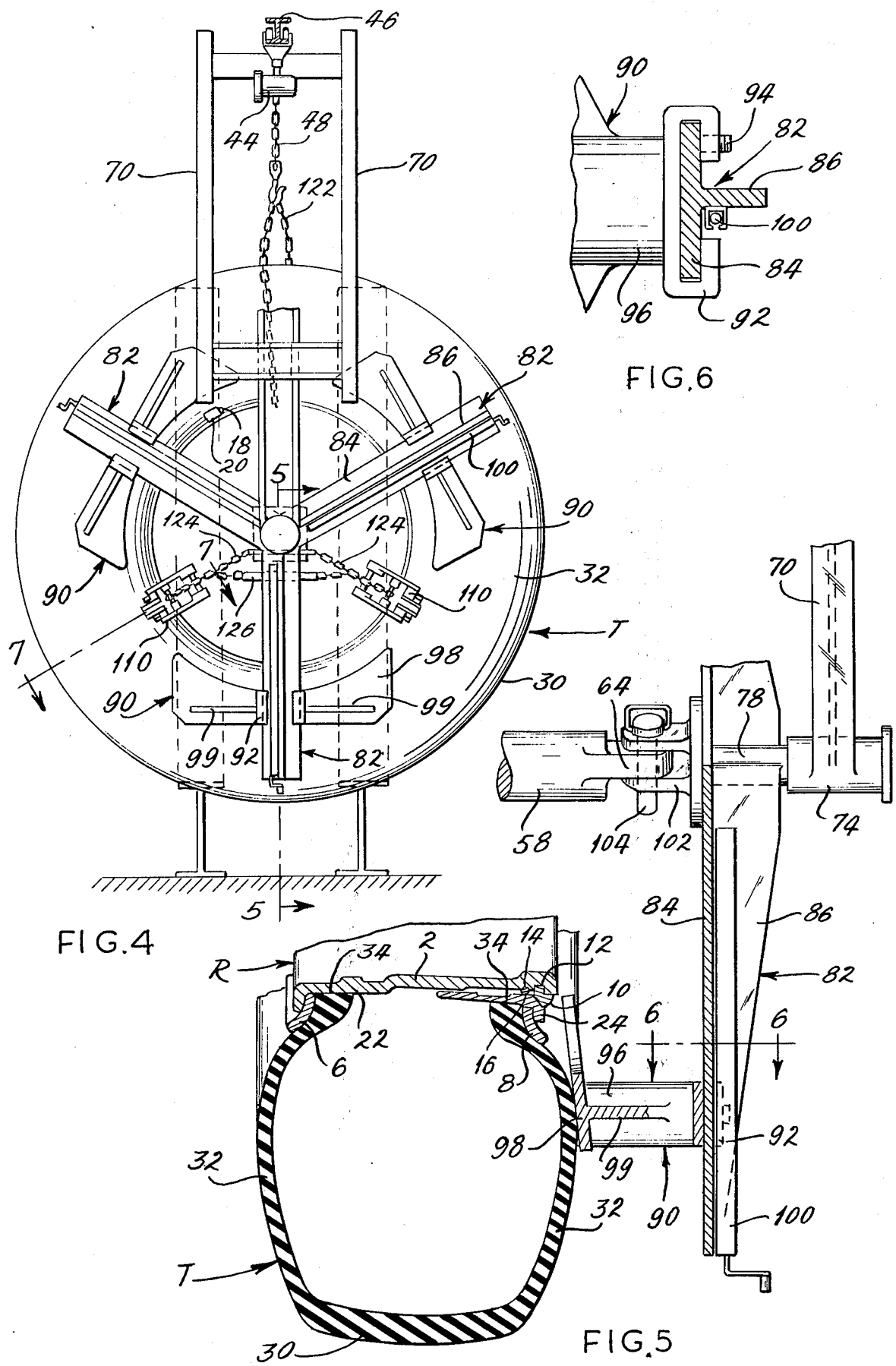

MACHINE FOR CHANGING GIANT TIRES

BACKGROUND OF THE INVENTION

This invention relates in general to tire changing equipment and more particularly to a machine for breaking large tires away from their rims.

Large trucks of the type used at mines and quarries as well as some earth moving equipment are often equipped with so-called giant tires which range up to nine feet in diameter. These tires when installed on their metal rims weigh over a ton each. Aside from being somewhat difficult to handle, these tires are extremely difficult to remove from the metal rims on which they are installed, at least by methods heretofore employed. Indeed, tha task is extremely burdensome and time consuming, often taking one man an entire work shift to change such a tire.

More specifically, most giant tires are of the tubeless variety and are installed on so-called five-piece rims. As the name implies, these rims have five basic components, namely, a rim base, a bead seat ring fitted over one side of the rim base, a flange at the side of the rim base opposite the bead seat ring, another flange on the bead seat ring, and a lock ring to hold the bead seat ring in place. The sidewalls of the tire at their inner margins have beads which tightly embrace tapered bead seats on the bead seat ring and the rim base adjacent to the flanges thereon to form air tight seals at those locations. After the tire has been in use for a short period of time, these seals are extremely difficult to break. Indeed, the rubber of the tire seems to almost bond to the metal of the rim at those locations.

The conventional procedure for breaking down a giant tire, that is for breaking the tire beads away from the tapered bead seats, is to lay the tire on its side and work around it step-by-step with a ram-type breakdown tool. This tool consists of a relatively small clamp which grips the flange on the rim and forms an anchor against which a small pneumatic ram is positioned. The ram in turn carries a small contoured shoe which is forced into the space between the tire sidewall and the flange to move the bead down the taper of the bead seat and thereby break it away from the bead seat. Each entry of shoe into the space between the flange and tire sidewall dislodges only a small portion of the sidewall from the bead seat since the shoe is only about 3 inches wide, and as a result, the clamp must be moved around the rim and the procedure repeated at relatively close intervals. This is time consuming. Also, there is a tendency to use pry bars and sledge hammers on the rim to accelerate the procedure, and this results considerable rim damage, sometimes rendering the rim is impossible to reassemble.

Not only is the conventional procedure for changing giant tires a time consuming and burdensome operation, but it also can be quite dangerous for inattentive workers. Indeed, workers have been seriously injured and partially disabled as a result of having their fingers pinched between the sidewalls and rim flanges.

SUMMARY OF THE INVENTION

One of the principal objects of the present invention is to provide a machine for breaking giant tires away from the rims on which they are installed in an extremely short time. Another object is to provide a machine of the type stated which may be operated by one or two individuals. A further object is to provide a machine of the type stated which is simple and rugged in construction. An additional object is to provide a machine of the type stated which presents little hazard to the operators of it and from a safety standpoint is far superior to conventional procedures for changing giant tires. These and other objects and advantages will become apparent hereinafter.

The present invention is embodied in a machine for breaking the sidewalls of pneumatic tires away from the rims on which they are mounted. The machine includes backing means to back the tire while a force exerted by force exerting means is applied to the tire sidewall through pressing means with the force being exerted through the hollow center of the rim. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 4 is a rear elevational view of the press head showing it bearing against the sidewall of a giant tire;

FIG. 5 is a sectional view taken along lines 5—5 of FIG. 4 and showing one shoe forced against the tire sidewall;

FIG. 6 is a sectional view taken along line 6—6 of FIG. 5;

DETAILED DESCRIPTION OF THE EMBODIMENTS

Figure 1:
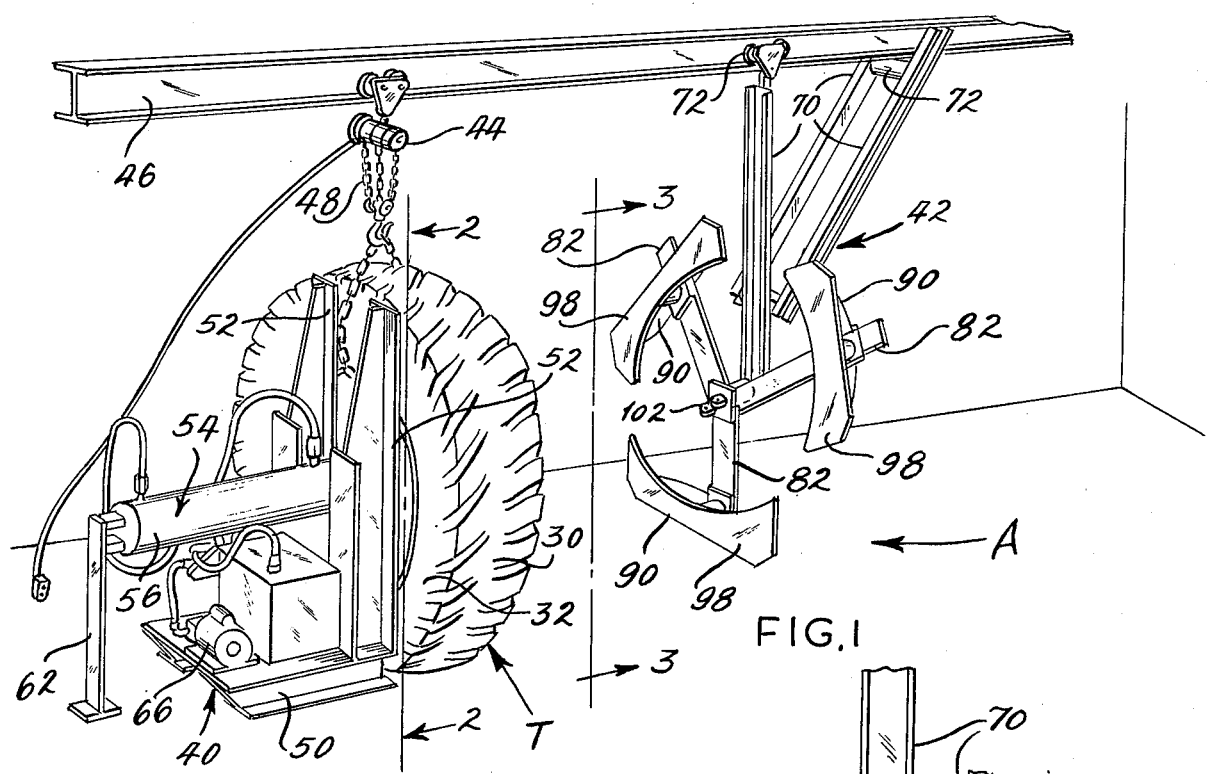
FIG. 1 is a perspective view of a tire changing apparatus of the present invention.

Referring now to the drawings (FIGS. 1 and 5), A designates a machine for breaking a giant tire T away from a rim R on which the tire T is mounted so that another giant tire T may be installed on the rim R.

The rim R is of the so-called five-piece variety and includes five basic components (FIG. 7), namely, a rim base 2, a bead seat ring 4 encircling one side of the rim base 2, flange 6 encircling the other side of the rim base 2, another flange 8 encircling the bead seat ring 4, and a lock ring 10 for retaining the bead seat ring 4 on the rim base 2. The portion of the rim base 2 which is encircled by the bead seat ring 4 has an outer groove 12 into which the locking ring 10 fits and an inner groove 14 into which an elastomeric O-ring 16 fits. The O-ring 16 is compressed between the rim base 2 and the bead seat ring 4, forming an air-tight seal between them. The locking ring 10 is split so that it can be removed from its groove 12 once the bead seat ring 4 is moved in slightly inwardly and it is prevented from jumping out of its groove 12 by a driver 18 (FIG. 4) which is driven through an apertured lug 20 projected axially from the rim base 2.

On the side opposite the bead seat ring 4 the rim base 2 has a tapered bead seat 22 (FIG. 7) which leads up to a short circumferential lip 24 against which the flange 6 is positioned. Likewise, the bead seat ring 4 on the other side of the rim base 2 also has a tapered bead seat 22 which leads up to a short lip 24 against which the other flange 8 is positioned. The two flanges 6 and 8 turn outwardly at their outer margins so that these portions of the flanges 6 and 8 are directed generally axially.

The giant tire T fits around the rim R and has (FIG. 5) a tread 30, sidewalls 32 extending inwardly from the tread 30, and sealing beads 34 at the inner margins of the sidewalls 32. The beads 34 seat against the tapered bead seats 22 forming air tight seals at those locations. The inner portions of the sidewalls 32 bear against and are retained by the flanges 6 and 8. After the tire T has been in use, the beads 34 become firmly adhered to the tapered bead seats 22 and this bond is extremely difficult to break even though the tire T is deflated.

The tire changing machine A includes (FIG. 1) a power section 40 and a pressing section 42 with the latter being connectable to the former. However, the pressing section 42 may be detached and moved away from the power section 40 so that the giant tire T can be placed between the two sections 40 and 42. In addition, some sort of lifting device is necessary for elevating the giant tires T to the proper position in front of the power section 40. Suitable for this purpose is a conventional chain hoist 44 which is supported on an overhead I beam 46. The hoist 44 has a chain 48 depending from it.

Figure 2:
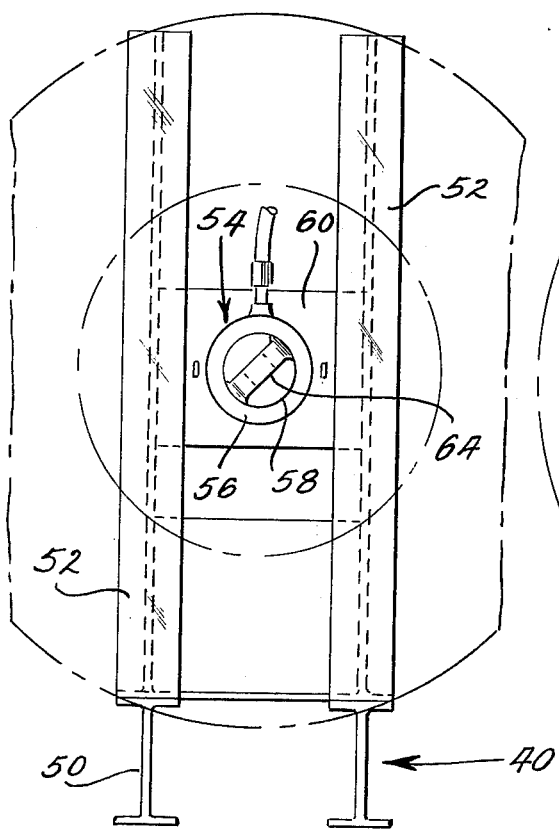
FIG. 2 is a front elevational view of the backstop on the power section of the tire changing apparatus.
Figure 7:
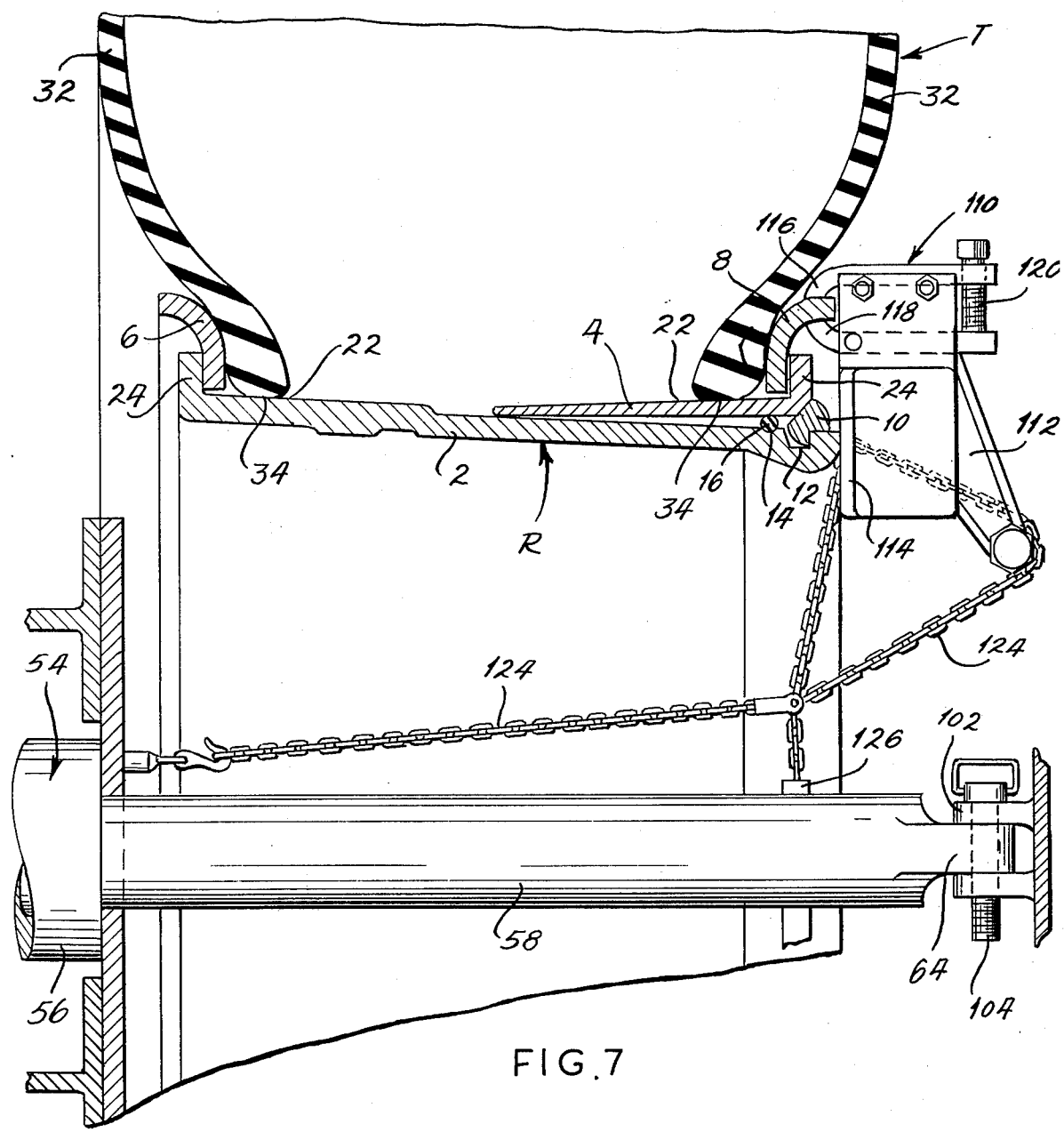
FIG. 7 is a sectional view taken along line 7—7 and showing the rim in cross section and a retaining clamp attached to the rim.

The power section 40 includes (FIGS. 1 and 2) a base 50 which is secured firmly to a floor or some other suitable supporting surface. Projecting upwardly from the base 50 are a pair of backing members 52 which are quite sturdy and are spaced apart a distance less than the diameter of the rim R so that the rim R as well as the tire T can be brought and positioned firmly against the front faces of the backing members 52. Those front faces lie in the same plane. The power section 40 further includes a double acting hydraulic cylinder 54, having a barrel 56 and a piston rod 58 projected therefrom. The rod end of the barrel 56, that is the end from which the rod 58 projects, is fastened securely to a cross piece 60 (FIG. 2) which in turn is extended between and attached firmly to the upright members 52 such that the axis of the rod 58 is perpendicular to the plane of the front faces on the upright members 52. The opposite end of the barrel 56 is attached to a supporting post 62 which is also fastened to the floor. At its exposed end the rod 58 is fitted with a coupling eye 64 (FIGS. 2 and 7). The hydraulic cylinder 54 receives pressurized hydraulic fluid from a motor and pump unit 66 (FIG. 1) which is carried by the base 50. Suitable valving is provided for directing the pressurized fluid to either end of the barrel 56.

The pressing section 42 includes a frame 70 (FIG. 1) which is suspended from the I beam 46 by means of rollers 72 so that it can be moved toward and away from the power section 40. The frame 70 in turn carries a horizontal sleeve bearing 74 (FIGS. 4 and 5), the axis of which is coaxial with the axis of the piston rod 58.

The sleeve bearing 74 on the frame 70 receives a spindle 78 which projects rearwardly from a press head 80 (FIG. 5), thus permitting the press head 80 to rotate with respect to the frame 70. The press head 80 has three arms 82 (FIGS. 3 and 4), which project radially from the spindle 78 at 120° intervals. Each arm 82 has a front plate 84 positioned opposite and parallel to the front faces of the upright backing members 52 on the powers section 40, and a gusset 86 (FIG. 5) welded to the back of the plate 84 and to the spindle 78.

Figure 3:
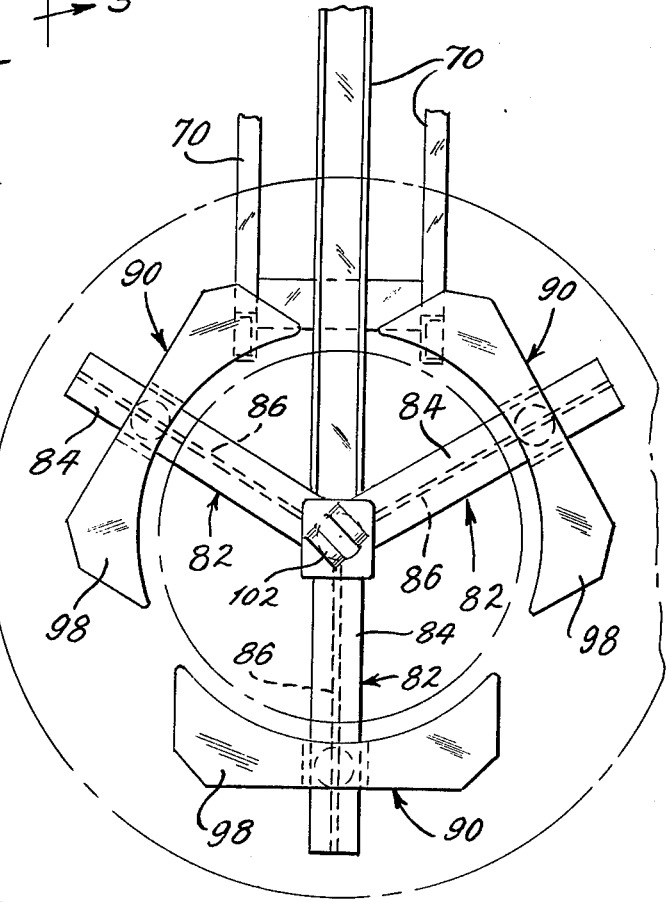
FIG. 3 is a front elevational view of the press head on the pressing section of the tire changing apparatus.

The arms 82 of the head 80 carry press shoes 90 (FIGS. 3–5) which project toward the power section 40. Each press shoe 90 includes a mounting bracket 92 which is generally C-shaped in cross-section (FIG. 6) so that it extends across the front of its front plate 84 as well as to the sides and partially behind the front plate 84. This configuration prevents the bracket from falling off of the arm 82, yet permits it to slide along the arm 82. The portion of the bracket 92 which extends behind the front plate 84 is provided with a set screw 94 which, when tightened, clamps the bracket 92 and the sleeve 90 in a fixed position on the arm 82. Welded to the bracket 92 is a short extension 96 (FIG. 5) which projects toward the power section 40, and the extension 96 in turn has a pressure or pressure plate 98 (FIG. 3) welded to it. Each presser plate 98 is backed by a reinforcing web 99 (FIGS. 4 and 5), a web 99 being located on each side of the extension 96. The presser plates 98 of the three shoes 90 have unobstructed faces presented towards the upright backing members 52 on the power section 40 and the inside margins of the plates are arcuate so that they conform generally to the curvature of the rim R (FIG. 3). Each plate 78 is inclined slightly with respect to the plane of the upright members 52 (FIG. 5) and such that its arcuate inner margin is located closer to the upright members 52 than its outer margin.

The shoes 90 are moved inwardly and outwardly on the arms 82 by adjusting screws 100 (FIGS. 4–6) which are located against the gussets 86 and have their nuts connected to the brackets 92 of the shoes 90. Of course, the adjusting screws 100 are only utilized when the set screws 94 are backed off.

Welded to the three arms 82 at the center of the press head 80 is a clevis 102 (FIGS. 3 and 5) which aligns with and is large enough to receive the coupling eye 64 of the piston rod 58. The clevis 102 and coupling eye 64 may be connected by a pin 104 (FIG. 5) which fits through them.

Figure 8:
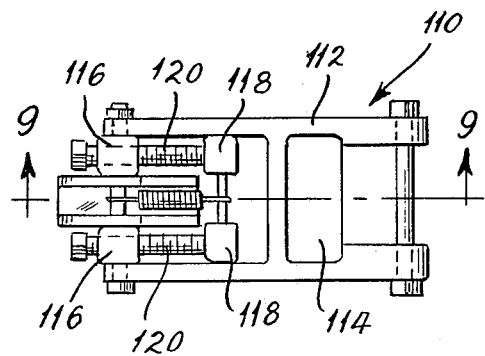
FIG. 8 is a plan view of one of the retaining clamps.

In addition to the foregoing components, the tire changing machine A is utilized with at least two bead ring retaining clamps 110 (FIGS. 4 and 7) which grip the flange 8 and project inwardly past the bead seat ring 4 and the rim base 2 to prevent the flange 8 and ring 4 from being drawn axially inwardly as a force is applied to the sidewall 32 of the tire T. More specifically, each retaining clamp 110 includes (FIGS. 7 and 8) a cast body 112 having an abutment plate 114 extended over most of one side. Secured to the body at one end are a pair of fixed jaws 116 which project beyond the abutment plate 114. The fixed jaws 116 are located opposite movable jaws 118 which pivot on the body 112 and are moved toward the fixed jaws 116 by jack screws 120. The spacing between each set of fixed and movable jaws 116 and 118 when they are open is great enough to accommodate the outwardly projecting portion of the flange 8 and when the jack screws 120 are tightened the jaws 116 and 118 tightly clamp the flange 8 (FIG. 7). In that instance the body 112 projects radially inwardly and the abutment plate 114 is located opposite the outer end of the bead seat ring 4 and the adjacent end of the rim base 2. The bead retaining clamp 110 may be fabricated from a ram clamp used with the conventional hand operated ram-type tool. The modification basically involves welding the abutment plate 114 to the ram clamp. Also, the clamp when so modified is installed on the rim so that it projects inwardly and not outwardly as does a conventional ram clamp.

OPERATION

To remove the rim R from the giant tire T requires breaking the tire sealing beads 34 away from the tapered bead seats 24 on the bead seat ring 4 and the rim base 2. This is done rapidly and with little manual effort on the tire changing machine A. To prepare the machine A for the giant tire, the piston rod 58 on the power section 40 is retracted, while the pressing section 42 is moved on the overhead I-beam 46 away from the power section 40 a sufficient distance to accommodate the tire T between the two sections.

Once the machine A is prepared to receive the tire T, a chain 122 (FIGS. 1 and 4) is placed through the rim R and around the tire sidewall 32 and tread 30. The chain 122 is hooked to the chain 48 of the chain hoist 44, and by means of the joist 44 the tire T is elevated to an upright position and positioned against the upright members 52 on power section 40 with the flange 6 facing the members 52. Thus, the bead seat ring 4, the flange 8, and the lock ring 10 face the pressing section 42. The tire T is maneuvered until the coupling eye 64 on the cylinder 54 is generally centered with respect to the hollow interior of the rim R.

Next, the piston rod 58 is run out, while the pressing section 42 is moved on its rollers 72 toward the upright tire I, until the clevis 102 receives the coupling eye 64. The piston rod 58 is attached to the press head 80 by the inserting of the clevis pin 104 through the coupling eye 64 and clevis 102.

Thereafter, at least two retaining clamps 110 are installed on the flange 8 at opposite sides of the rim R with their abutment plates 114 presented across the locking ring 10 and the ends of the rim base 2 (FIG. 4). In other words, the retaining clamps 110 project inwardly toward the axis of the rim R. The clamps 110 are installed by fitting the jaws 116 and 118 over the outwardly projecting portions of the flange 8 and then running down the jack screws 120 with the jaws 116 and 118 tightly clamping the flange 8 (FIG. 7). Next, the inner ends of the clamps 110 are tied to the cross piece 60 between the two upright members 52 by two chains 124 (FIGS. 4 and 7) which in turn are made taut by a chain tightener 126 extended between them.

Next, the piston rod 58 is run inwardly until the presser plates 98 of the shoes 90 are located opposite the sidewall 32 on the tire (FIG. 5). In this regard, the press head 80 can be rotated as it moves inwardly so that the shoes 90 clear the retaining clamps 110. Then the adjusting screws 100 are turned to position the shoes 90 such that the curved inner margins of the presser plates 98 are located just beyond the flange 8 of the rim R (FIG. 4). The shoes 90 are retained firmly in place by tightening the set screws 94.

Once the press head 80 is correctly positioned, the piston rod 58 is retracted still further, and this brings the presser plates 98 of the shoes 90 firmly against the sidewall 32 of the giant tire T. Indeed, a substantial force is applied to the sidewall 32, but since the presser plates 98 have substantial length, the force is spread over a relatively large area and results in rather uniform defomation of the sidewall 32. In this regard, it should be noted that without the retaining clamps 110, both the flange 8 and the bead seat ring 4 would move inwardly toward the upright members 52 as the force is applied. The force applied to the sidewall 32 through the press head 80 builds up until it overcomes the resistance of tire bead 34 seated against the tapered bead seat 22 on the bead seat ring 4. At that instance, the entire sidewall 32 snaps inwardly toward the other sidewall 32 and is dislodged from the bead seat 22 of the ring 4.

Once the bead 34 is broken loose from the ring 4, the piston rod 58 is extended and the presser head 80 is disconnected from it by withdrawing the clevis pin 104. Thereafter, the retaining clamp 110, the chains 124, and chain tightener 126 extend between them are detached. At this time, the bead seat ring 4, the lock ring 10 and the flange 8 are all rather loosely disposed about the rim base 2. The driver 18 is then driven out of its lug 20 and the locking ring 10 is removed followed by the rubber O-ring 16 which may be cut to completely free it from the rim R.

Thereafter, the tire T is reversed so that the flange 6 and the other sidewall 32 face the pressure head 80. The foregong procedure is repeated with respect to this side of the tire T, only the retaining clamps 110 are not necessary, since the tapered bead seat 22 (against which the remaining bead 34 is seated) is formed on the rim base 2 itself which on its opposite side bears against the upright members 52.

When the two beads 34 are broken away from their respective bead seats 22, the tire T is laid on the floor and the bead seat ring 4 and flange 8 are withdrawn from it. Then the tire T is turned over and the rim base 2 is pulled from it.

In lieu of mounting the pressing section 42 on the frame 70 suspended from the I-beam 46, the pressing section 42 may be mounted on a carriage which rolls toward and away from the power section on the floor.

This invention is intended to cover all changes and modifications of the example of the invention herein chosen for purpose of the disclosure which do not constitute departures from the spirit and scope of the invention.

What is claimed is:

1. A machine for breaking the beads on the sidewall of a tire away from tapered bead seats on a rim, the rim including a rim base having one of the bead seats thereon, a bead seat ring surrounding a portion of the rim and having another of the bead seats thereon, and flange adjacent to the tapered bead seat for restraining the sidewall, said machine comprising: backing members having a backing surface thereon of sufficient size to form a backstop for the rim; a press head movable toward and away from the backing surface and having shoes which align with the tire sidewall for engaging the sidewall when the head is moved toward the backing surface with the tire and rim positioned against the backing surface; force exerting means mounted in a fixed position with respect to the backing members and having a movable element which extends through the interior of the rim and is connected with the press head, whereby the force is applied to the sidewall of the tire to break the bead thereon away from its bead seat on the rim, the force exerting means being detachable from the press head so that the tire can be positioned against and removed from the backing members; and retaining means for gripping the tire flange adjacent to the bead seat of the bead seat ring when that ring is presented toward the press head and for preventing the bead seat ring from moving toward the backing surface as the shoes of the press head are forced against the tire sidewall which surrounds the bead seat rings, said retaining means including a rigid body and jaws which grip the flange on the bead seat ring, the rigid body projecting radially inwardly across the ends of the bead seat ring and the rim base when the jaws grip the flange, whereby the body abuts against the ends of the bead seat ring and the rim base as the force is applied to the tire sidewall by the press head, said retaining means further including tying means connected between the inner ends of the body and the backing members for preventing the inner ends from moving away from the backing members as a result of a moment applied to the body at the jaws.

2. A machine for breaking the beads on the sidewalls of a tire away from the tapered bead seats on a rim which includes a rim base having one of the bead seats located thereon at one end thereof, a bead seat ring encircling the rim base at the other end of the rim base and having the other bead seat located thereon such that it is spaced axially from the bead seat of the rim base, flanges projecting radially outwardly from the rim base and bead seat ring at the ends thereof, the flanges being adjacent to the tapered bead seats on the rim base, and on the bead seat ring and being prevented from moving away from each other, and a lock ring engaged with the rim base at said other end thereof and projecting radially outwardly adjacent to the bead seat ring such that it prevents the bead seat ring from moving axially away from the bead seat on the rim base, the tire having sidewalls located next to the flanges and being provided with beads which seat against the tapered bead seats, said machine comprising: backing means forming a rigid surface against which said one end of the rim is positioned, a press head movable toward and away from the backing surface and including a plurality of pressure plates which are positioned to bear against that sidewall of the tire which is located away from the backing surface, the pressure plates being positioned radially outwardly from the flange on the bead seat ring so as not to interfere with that flange; force exerting means for advancing the press head toward the backing surface under substantial force so as to cause the pressure plates to move the sidewall of the tire against which they bear axially with respect to the rim and thereby break the bead on that sidewall away from the tapered bead seat on the bead seat ring; and a clamp including opposed jaws capable of moving together until the spacing between them corresponds to the thickness of the flange so as to tightly grip the flange adjacent to the sidewall against which the pressure plates bear, the clamp including a portion which projects radially inwardly past said other end of the rim base which is encircled by the bead seat ring with said portion being sufficiently close to said other end of the rim base to cause the clamp to bear against said other end of the rim base as the force is applied to the sidewall at the pressure plates, whereby the bead seat ring is prevented from moving axially toward the backing surface and the sidewall against which the pressure plates bear is forced axially over the bead seat on the bead seat ring.

3. A machine according to claim 2 wherein the force exerting means includes a movable element which moves past the rigid surface of the backing means and is connectable with the press head beyond the backing means.

4. A machine according to claim 3 wherein the force exerting means is a hydraulic cylinder having a barrel which is fixed in position with respect to the backing means and the movable element is the piston rod of the hydraulic cylinder.

5. A machine according to claim 3 wherein the backing surface on the backing means is generally upright and the press head moves generally horizontally.

6. A machine according to claim 5 which further comprises a supporting frame on which the press head is mounted, the frame being movable toward and away from the backing means and remaining aligned with the movable element as it moves.

7. A machine according to claim 6 which further comprises wheels on the supporting frame, the wheels rolling on an overhead track so that the press head is suspended from the overhead track.

8. A machine according to claim 7 wherein the press head rotates on the frame about a horizontal axis so that the circumferential positions of the pressure plates against the tire sidewall may be changed.

9. A machine according to claim 2 wherein the pressure plates are movable on the press head to accommodate tires of different sizes.

10. A machine according to claim 9 wherein the press head comprises a plurality of equally spaced arms extending radially from the center of the press head, and the pressure plates are mounted on and movable relative to the arms.

11. A machine according to claim 10 wherein the force exerting means connects with the press head at the center thereof.

12. The machine according to claim 2 wherein the press head is detachable from the force exerting means and the force exerting means extends axially through the center of the rim such that the force is applied through the center of the rim.

13. The machine according to claim 2 and further comprising tying means having one end fixed in position with respect to the backing surface and the other end connected to the clamp radially inwardly from the portion thereof which bears against the said other end of the rim base for resisting the moment exerted on the clamp as a result of the application of the force to the tire sidewall.

14. The machine according to claim 13 wherein the clamp extends radially inwardly from said other end of the rim base a distance less than the radius of the rim so that it terminates short of the axis of the rim.

15. A machine for breaking the beads on the sidewall of the tire away from tapered bead seats on a rim having outwardly projecting flanges at its ends which are located adjacent to the bead seats and restrain the sidewalls said machine comprising: upright backing members having a vertical backing surface thereon against which the rim of the tire is positioned; a frame movable toward and away from the backing members; a press head mounted on the frame and including a plurality of arms radiating from a central axis which is substantially coincident with the axis of the rim when the rim is located against the backing surface, the arms being spaced apart at substantially equal angles, shoes mounted on the arms for radial movement toward and away from the central axis, each shoe including a presser plate presented toward the backing surface to bear against that tire sidewall which is located away from the backing surface, each presser plate having ends located away from its arm and further having an arcuate inner margin which extends generally between the ends and is concave so as to generally conform to the curvature of the flange on the end of the rim, the pressure plate further being inclined at a fixed oblique angle with respect to the central axis such that the inner arcuate margin of the plate is located closer to backing surface than portions of the plate located radially outwardly from the arcuate margins, each presser plate having substantially greater length in the circumferential direction along its arcuate margin than in the transverse direction which is generally radial to the central axis, the arrangement and configuration of the presser plates being such that the ends of adjacent presser plates are located relatively close together and the arcuate margins of the presser plates are located along a substantial portion of the flange on the rim; a fluid cylinder located generally beyond the vertical backing surface and having a movable member which projects through the rim; and means for detachably coupling the movable member of the cylinder with the press head generally along the central axis of the press head, whereby when the movable member is retracted, the presser plates of the press head are brought against the sidewall of the tire and the force exerted thereby breaks the tire bead away from its bead seat.

16. A machine according to claim 15 wherein the press head is rotatable on the frame about the central axis which is perpendicular to the backing surface on the backing members, so that the circumferential positions of the shoes against the tire sidewall may be altered.

17. A machine according to claim 15 and further comprising: retaining means for gripping the tire flange adjacent to the bead seat of the bead seat ring when that ring is presented toward the press head and preventing the bead seat ring from moving toward the backing surface as the presser plates of the press head are forced against th tire sidewall which surrounds thte bead seat ring.

18. A machine according to claim 17 wherein the retaining means includes a rigid body and jaws which grip the flange on the bead seat ring, the rigid body projecting radially inwardly across the ends of the bead seat ring and the rim base when the jaws grip the flange, whereby the body abuts against the ends of the bead seat ring and the rim base as the force is applied to the tire side by the press head.

* * * * *